Sept. 16, 1952 W. J. POLYDOROFF ET AL 2,611,123

HIGH-FREQUENCY APPARATUS

Filed Aug. 2, 1950 2 SHEETS--SHEET 1

WLADIMIR J. POLYDOROFF
JOHN E. JOHANSON
INVENTORS
BY Samuel Klontz
Attorney

HIGH-FREQUENCY APPARATUS

Filed Aug. 2, 1950 2 SHEETS—SHEET 2

WLADIMIR J. POLYDOROFF
JOHN E. JOHANSON
INVENTORS

BY Samuel Lebourg
Attorney

UNITED STATES PATENT OFFICE 2,611,123

HIGH-FREQUENCY APPARATUS

Wladimir J. Polydoroff, Kensington, Md., and
John E. Johanson, Boonton, N. J.

Application August 2, 1950, Serial No. 177,251

6 Claims. (Cl. 336—131)

Our invention relates to an improved high-frequency tuning apparatus, and its operating mechanism for variable inductance devices or other variable reactance devices, where variation of electrical constants is being accomplished by a linear movement which may be translated into a rotating manual movement for tuning.

This invention is particularly adapted to high-frequency and ultra high-frequency circuits such as are now being used in television, and where two or more high-frequency ranges may be covered by the same device, while switching from one range to another is rendered very simple and economical.

One object of our invention is to provide a gang operation of a plurality of variable reactances so that several circuits can be mechanically and electrically tracked together.

Another object is to have the linear movement of a plurality of tuning elements so arranged that a linear movement in one direction will automatically correspond to one frequency range of the tuning unit, while a movement in reverse direction will correspond to another range.

Still another object of the invention is to provide a compact and rugged assembly of all the moving parts so that ultimate tuning of all circuits will be performed accurately and smoothly.

It may be desirable to have tuning apparatus capable of continuous tuning or tuning by steps. This new invention gives the choice of either method and, in addition, may provide a step tuning with a finer adjustment within each step.

The invention will be better understood if reference is made to the accompanying drawing in which.

Figure 1:
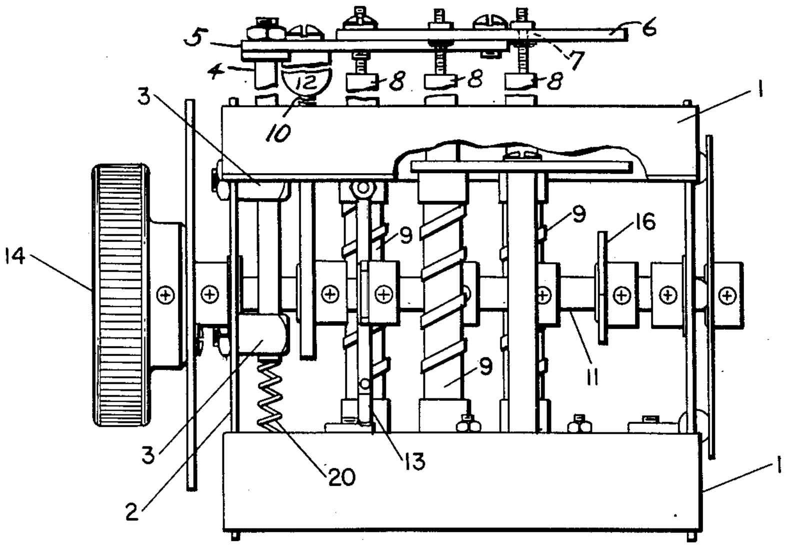
Fig. 1 represents a side view of the tuning unit.

Referring now to Figure 1: It shows a rigid box-type frame 1 which houses the assembly. One of its walls 2 is provided with four bushings 3 into which sliding rods 4, connected together by a bridle 5 may slide up and down. A plate 6 is secured to bridle 5 and is provided with holes 7 into which tuning elements 8 are mounted.

Figure 4:
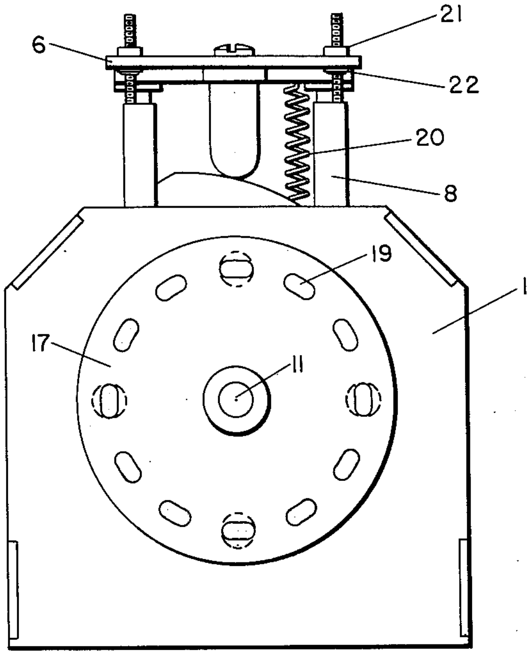
Fig. 4 is another side view showing a detent mechanism.

In Figure 4 is shown nut 21 which is secured to plate 6 by riveting over spring 22. This provides a stationary nut which in rotating provides a fine adjustment for movable element 8. These elements 8 may be in a form of magnetic cores. Directly in line with these movable elements are mounted inductance coils 9 into which the movable cores 8 engage themselves to thereby vary the inductance of the tuning elements; bridle 5 may be actuated up and down together with tuning elements 8 by means of a cam 10 which rotates on a shaft 11 and, during its rotation is followed by a cam follower 12 to thereby translate a rotating movement into a linear movement. In addition a spring 20 is provided which keeps the cam and its cam follower in close contact at all times.

The shaft 11 is bearing at both ends of the frame 1 and, in addition this shaft carries a plurality of smaller cams 16 of a semi-circular type, the purpose of these cams being to actuate the spring contact 13 arranged on the sides of the coils 9. To the main tuning cam 10 such a shape is given that during one complete revolution, by means of tuning knob 14, the bridle 5, plate 6 and tuning elements 8 will travel once inwards and once outwards with relation to coils 9.

Figure 2:
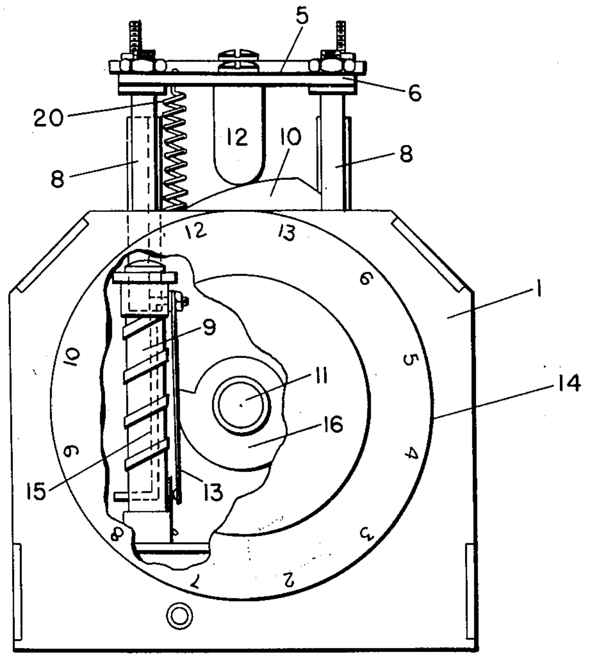
Fig. 2 shows another side view of the invention with a detail of one of the tuning elements.

It can be seen from Figure 2 that the small cams 16 are pressing against springs 13, thus making contact while the moving parts are moved upwards. (This corresponds to a counter-clockwise movement of the dial.) When the bridle 5 reaches its maximum position, the heart-shaped cam 10 reverses the linear movement so that bridle 5 comes down and the cores 8 begin to move into the coils. At that position, the cams 16 release springs 13, thus opening the contacts. Thus it can be easily understood that in this instance the upward movement of the cores corresponds to one frequency range of operation of the variable inductances and the downward movement to another frequency range. The contact springs 13 are so arranged that they shunt a portion of inductance coils 9 leaving in the circuit the inductance of a central wire 15, suitable for a higher frequency range.

The same spring contacts 13 may be arranged to bring in and out of operation additional reactive elements, capacitances, inductances or both into the circuit to provide dual frequency operation. The variable reactances employed in this unit may also be of a different type. For instance, one known as a lecher wire, another as collapsible lines or a third as collapsible cavities, are being used for ultra high-frequency operation, these last being in the form of two hollow cylinders telescopically engaging each other, one being stationary and the other being on a movable plate 6; in the case of lecher wires the linear movement, as described above, may actuate short-circuiting elements, changing the length of lecher wires for tuning.

It has been found that such short-circuiting arrangement may introduce additional friction and contact troubles, in which case it may be replaced by capacitive short-circuiting as follows:

The lecher wires may be made in the form of ceramic tubing, outside surface of which is metallized and the metallic double rods engage into the tubing, which in effect is the equivalent to a metallic short-circuiting of a pair of wires, or the stationary lecher wires may be made of metal and the short-circuiting elements of ceramic material of high dielectric constant providing the same effect. In all cases of ultra high-frequency tuning the whole range is again sub-divided into two ranges so that upward movement corresponds to a range in which additional contacts 13 are brought into action and released during downward movement to bring into circuits additional reactances so that again one complete revolution of dial 14 again corresponds to two ranges of frequencies.

Figure 3:
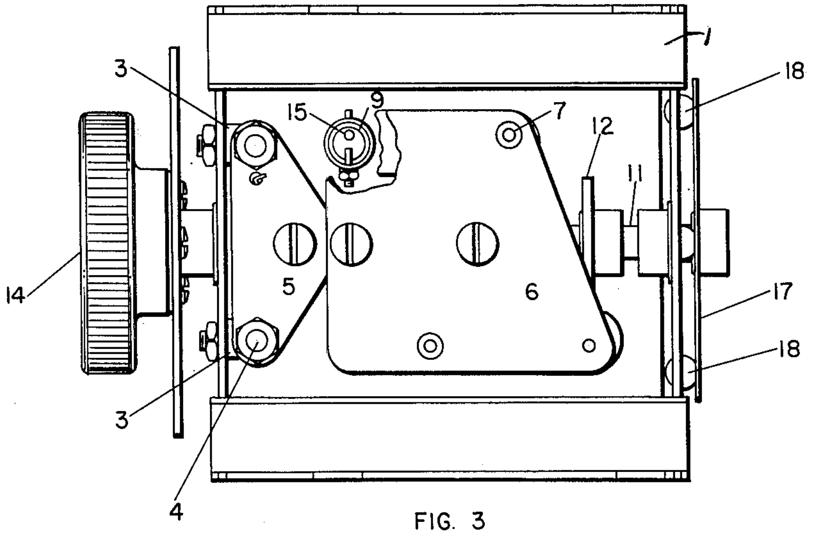
Fig. 3 is the plan view of the apparatus.

It may be desirable when tuning to have a continuous tuning for any frequency within a range, in which case a brake action should be additionally provided to counteract the tension of spring 20. Such braking action may be provided by a flexible metallic disc 17 shown on Figures 3 and 4 rubbing against balls 18. It will be noted that disc 17, as shown on Figure 4, has a plurality of elongated slots 19. Those slots engage into balls 18 and provide a detent action on the dial 14, which dial may be correspondingly marked with operating frequency channels. These slots 19 are made elongated in order that a small movement within a detent could be easily felt on a dial so as to provide a fine tuning within each channel.

It is understood that the dial may be provided with additional vernier action so as to increase the tuning accuracy particularly needed in case of continuous tuning, in which case slots 19 may be omitted.

It is understood that any other arrangement of a mechanism translating a rotation into linear movement may be employed, such as an eccentric disc provided with a suitable follower, which also may produce reciprocal movement.

It has been found essential in the present invention to provide a shaft, common to the dial, main cam and small cam, the rotation of which ultimately controls the reciprocal movement of tuning elements while, at the same time, performing desired switching operations so that a dual-frequency operation is made possible by simple and reliable means.

Having thus described our invention, what we claim is:

1. High frequency tuning apparatus comprising a plurality of variable reactors each having a stationary and a movable element to thereby change their reactance with linear movement of said movable elements, said reactors each having two different values of reactance to correspond to two different frequency ranges, electrical switching means to switch from one frequency range to another, mechanical means translating a manual rotation into a reciprocal linear movement, a plurality of rotatable members actuating said switching means, said rotating members, and said translating means having a common shaft so that one frequency range is produced during a forward movement of the movable elements and another frequency range during their backward movement.

2. A high frequency tuning apparatus comprising a plurality of variable inductors, each having a stationary coil and a movable core, whose inductance is varied by a unitary tuning means, said inductors having two different values of their inductances to tune to two different frequency ranges, electrical switching means to alter the values of said inductances, a rotatable dial, mechanical means to translate the rotation of said dial into reciprocal linear movement actuating said movable cores, and a plurality of cams having a common shaft with said dial and engaging said switching means in one direction of said reciprocal linear movement and disengaging said means in the other direction.

3. A high frequency tuning apparatus comprising a plurality of variable reactors, each having a stationary and a movable element to thereby change their reactance with linear movement of said movable elements, a rotatable dial, a heart-shaped cam to translate one whole revolution of said dial into forward and backward movement of said movable element, said reactors being arranged so as to have two different values of reactance to correspond to two different frequency ranges of tuning, electrical switching means to alter the frequency ranges, a plurality of rotatable members actuating said switching means, said rotatable members and said mechanical translating means having a common shaft so that one frequency range is produced during a forward movement of the movable element and another frequency range during their backward movement.

4. A high frequency tuning apparatus comprising a plurality of variable reactors, each having a stationary and a movable member, a common carrier supporting said movable members by means of a stationary nut providing fine adjustment, a rotatable shaft, a mechanical translating means to produce a linear movement of said movable members with rotation of said shaft, electrical switching means to alter the frequency range of said reactors, a brake in a form of a frictional disc, said mechanical translating means, switching cams and disc being mounted on the same said shaft.

5. An apparatus according to claim 4 in which said disc is provided with slots for detent tuning to a desired frequency channel.

6. An apparatus according to claim 5 in which said detents are formed by elongated slots in the disc rubbing against balls in order to provide fine manual tuning within each channel.

WLADIMIR J. POLYDOROFF.
JOHN E. JOHANSON.

REFERENCES CITED

The following references are of record in the file of this patent:

UNITED STATES PATENTS

| Number | Name | Date |
|---|---|---|
| 2,079,843 | Dallenbach | May 11, 1937 |

FOREIGN PATENTS

| Number | Country | Date |
|---|---|---|
| 239,007 | Great Britain | Sept. 3, 1925 |